US012468856B2

(12) United States Patent
Adebayo et al.

(10) Patent No.: US 12,468,856 B2
(45) Date of Patent: Nov. 11, 2025

(54) AI-ASSISTED COMPLIANCE MAPPING

(71) Applicant: International Business Machines Corporation, Armonk, NY (US)

(72) Inventors: Abdulhamid Adebowale Adebayo, White plains, NY (US); Anca Sailer, Scarsdale, NY (US); Muhammed Fatih Bulut, West Greenwich, RI (US); Daby Mousse Sow, Croton on Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 970 days.

(21) Appl. No.: 17/577,978

(22) Filed: Jan. 18, 2022

(65) Prior Publication Data

US 2023/0229812 A1    Jul. 20, 2023

(51) Int. Cl.
*G06F 21/64* (2013.01)
*G06N 20/00* (2019.01)

(52) U.S. Cl.
CPC ............. *G06F 21/64* (2013.01); *G06N 20/00* (2019.01)

(58) Field of Classification Search
CPC ................................ G06F 21/64; G06N 20/00
See application file for complete search history.

(56) References Cited

U.S. PATENT DOCUMENTS

| | | | |
|---|---|---|---|
| 8,063,929 B2 | 11/2011 | Kurrz et al. | |
| 9,430,570 B2 | 8/2016 | Button et al. | |
| 10,331,644 B2 | 6/2019 | Smart | |
| 10,917,439 B2 | 2/2021 | Puratheppparambil et al. | |
| 2020/0021620 A1* | 1/2020 | Puratheppparambil | H04L 63/102 |
| 2020/0031130 A1 | 1/2020 | Shibata et al. | |
| 2020/0311308 A1 | 10/2020 | Arbuckle et al. | |

OTHER PUBLICATIONS

Mowafi et al. "A Context-aware Adaptive Security Framework for Mobile Applications." ICCASA 14 (2014): 147-153ICST.
Fischer et al., "Modelling security relevant context an approach towards adaptive security in volatile mobile web environments." (2011): 1-3.

(Continued)

*Primary Examiner* — Pei Yong Weng
(74) *Attorney, Agent, or Firm* — Amin, Turocy & Watson, LLP

(57) ABSTRACT

One or more systems, devices, computer program products and/or computer-implemented methods of use provided herein relate to compliance mapping, and more particularly to aggregated mapping of one or more sets of context-based compliance data with standard compliance data, such as from a target domain and one or more associate domains. A system can comprise a memory that stores computer executable components, and a processor that executes the computer executable components stored in the memory, wherein the computer executable components can comprise a mapping component that can map a compliance control for a target domain based on a model trained by an active learning process that incorporates a plurality of contexts representing relationships between entities and associate domain specific dependencies.

25 Claims, 10 Drawing Sheets

(56) References Cited

OTHER PUBLICATIONS

Parundekar et al., "Linking and building ontologies of linked data." International Semantic Web Conference. Springer, Berlin, Heidelberg, 2010.
Johnson et al., "A framework for shrink-wrapping security services." 2010 IEEE International Conference on Services Computing. IEEE, 2010.
Elayan et al., "Digital Twin for Intelligent Context-Aware IoT Healthcare Systems." IEEE Internet of Things Journal (2021).
Mell et al., "The NIST Definition of Cloud Computing," Recommendations of the National Institute of Standards and Technology, NIST Special Publication 800-145, Sep. 2011, 7 pages.

* cited by examiner

AI-ASSISTED COMPLIANCE MAPPING

BACKGROUND

Compliance is the process of ensuring that a minimum of requirements is met. The requirements can originate from federal, state, local, association and/or organization rules and/or regulations, among others. Other requirements can be custom created for a situation, instance and/or otherwise. The compliance can allow for security, data maintenance, information backup, organized information storage, testing compliance and/or the like, among other practices.

One such practice, security compliance, is the process of ensuring that a minimum of security requirements is met. The security requirements can originate from federal, state, local, association and/or organization rules and/or regulations, among others. Other security requirements can be custom created for a situation, instance and/or otherwise. The security compliance (e.g., in lieu of following the security requirements) can allow for protection of data, protection of access and/or enforcement of security, among other practices.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products can facilitate determination of semantic relationships of arguments labels provided in two or more languages. This can facilitate favorable comparison, analysis and/or other use of text relative to two or more languages, where the text is defined by the argument labels. The semantic relationships determined can comprise similar relationships and/or different relationships, one-to-one relationships and/or one-to-many relationships, and/or relationships for homogeneous or heterogeneous argument labels.

In accordance with an embodiment, a system can comprise a memory that stores computer executable components, and a processor that executes the computer executable components stored in the memory, wherein the computer executable components can comprise a mapping component that can map a compliance control for a target domain based on a model trained by an active learning process that incorporates a plurality of contexts representing relationships between entities and associate domain specific dependencies.

In accordance with another embodiment, a computer-implemented method can comprise mapping, by a system operatively coupled to a processor, a compliance control for a target domain based on a model trained by an active learning process that incorporates a plurality of contexts representing relationships between entities and associate domain specific dependencies.

In accordance with yet another embodiment, a computer program product facilitating compliance control mapping can comprise a computer readable storage medium having program instructions embodied therewith, the program instructions executable by a processor to cause the processor to map, by the processor, the compliance control for a target domain based on a model trained by an active learning process that incorporates a plurality of contexts representing relationships between entities and associate domain specific dependencies.

One or more advantages of the aforementioned system, computer-implemented method and/or computer program product can comprise AI-supported and/or even automatic generation and/or updating of mapping results for a compliance control based on one or more associate domains, where the associate domains can comprise custom, different and/or context-specific information as compared to the target domain. That is, the mapping result generated by the system can provide tracking of context-specific results as compared to base results. This can aid administrating entities in making batter compliance control decisions by balancing and/or comparing context-specific and base results.

In one or more cases, the mapping can facilitate comparison between domains (e.g., comprising different rule and/or regulation sets) employing different terms, names, languages and/or even sentence structure from one another. That is, although general semantics can vary, the system can map, in an aggregated manner, domains having different technical granularity for different portions of domain-based information (e.g., one or more portions of rules and/or regulation sets comprised by the domains and/or based on the domains).

In one or more embodiments, a context component can generate the plurality of contexts by sorting the entities into groups based on similarity value that characterizes the associate domain specific dependencies. An advantage of this can comprise allowing for comparison of context-specific information with base information of a target domain.

In one or more embodiments, the model can execute a context generation task and can supply context result data to define the plurality of contexts, wherein a first context information defines a first validation of the context result data, and wherein a second context information defines a second validation of the context result data. An advantage of this can comprise allowing for comparison of context-specific information with base information of a target domain.

In accordance with another embodiment, a system can comprise a memory that stores computer executable components, and a processor that executes the computer executable components stored in the memory, wherein the computer executable components can comprise a mapping component that trains a model for mapping a compliance control by aggregating validation data from a plurality of contexts, wherein the validation data is based on an output of the model, and wherein the plurality of contexts are based on one or more target domains associated with the compliance control.

In accordance with another embodiment, a computer-implemented method can comprise training, by a system operatively coupled to a processor, a model for mapping a compliance control by aggregating validation data from a plurality of contexts, wherein the validation data is based on an output of the model, and wherein the plurality of contexts are based on one or more target domains associated with the compliance control.

One or more advantages of the aforementioned system and/or computer-implemented method can comprise AI-supported and/or even automatic generation and/or updating of mapping results for a compliance control based on one or more associate domains, where the associate domains can comprise custom, different and/or context-specific information as compared to the target domain. That is, the mapping result generated by the system can provide tracking of context-specific results as compared to base results. This can aid administrating entities in making batter compliance control decisions by balancing and/or comparing context-specific and base results.

In one or more cases, the mapping can facilitate comparison between domains (e.g., comprising different rule and/or regulation sets) employing different terms, names, languages and/or even sentence structure from one another. That is, although general semantics can vary, the system can map, in an aggregated manner, domains having different technical granularity for different portions of domain-based information (e.g., one or more portions of rules and/or regulation sets comprised by the domains and/or based on the domains).

In one or more embodiments, a context component can generate the plurality of contexts by sorting the entities into groups based on similarity value that characterizes the associate domain specific dependencies. An advantage of this can comprise allowing for comparison of context-specific information with base information of a target domain.

In one or more embodiments, the model can execute a context generation task and can supply context result data to define the plurality of contexts, wherein a first context information defines a first validation of the context result data, and wherein a second context information defines a second validation of the context result data. An advantage of this can comprise allowing for comparison of context-specific information with base information of a target domain.

DETAILED DESCRIPTION

Figure 1:
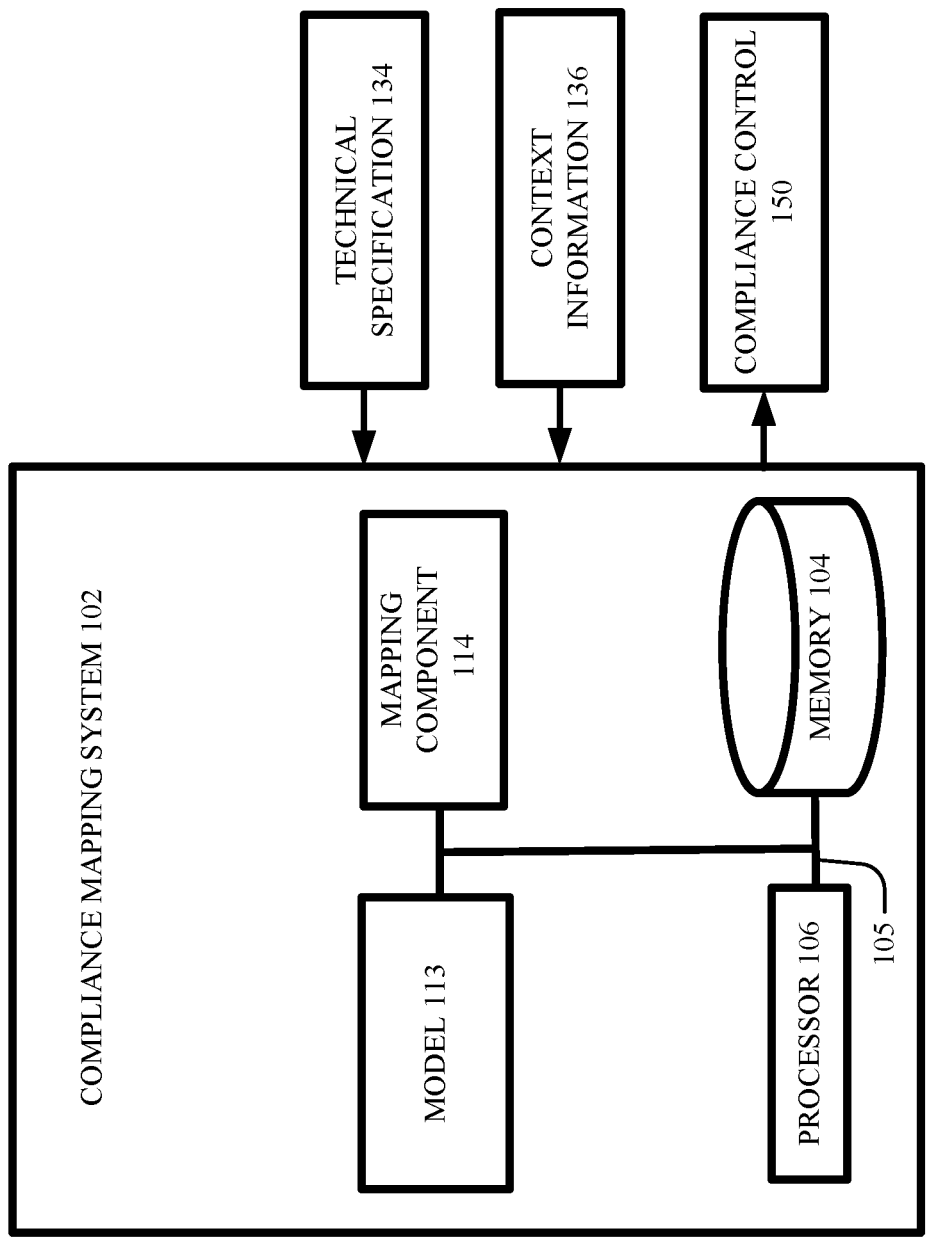
FIG. 1 illustrates a block diagram of an example, non-limiting system that can facilitate compliance mapping, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

With respect to security compliance, the security requirements for any one or more groups (e.g., federal, state, local, association and/or organization level) can change frequently. Changes can be numerous at any frequency instance and/or each can be expected to be communicated and/or translated across various parts of a business controlled by one or more administrating entities. Notification of change can be communicated at a slower speed than the change itself and/or omitted entirely.

To further exacerbate a process for maintaining such security compliance by the one or more administrating entities, different rule and/or regulation sets, and/or different administrating entities, can employ different terms, names, languages and/or even sentence structure from one another. That is, general semantics can vary. One or more portions of rules and/or regulations can be extended in one set as compared to another, and/or one or more portions of rules and/or regulations can be omitted in one set as compared to another. That is, technical granularity can differ across different rule and/or regulation sets.

Accordingly, balancing, understanding, summarizing and/or maintenance of such dynamically changing security requirements can be difficult and/or take undesired amounts of manual work and/or time. Moreover, it can be desired to separate and/or identify context-specific mappings from default, standard and/or generally acceptable mappings.

Described herein are one or more embodiments of a system, computer-implemented method and/or computer program product that can account for one or more deficiencies of exiting techniques for compliance control mapping and/or for maintaining compliance control. Generally, provided are one or more embodiments of a system, computer-implemented method and/or computer program product that can facilitate compliance control modeling by developing individual context for different entities (e.g., individual entities, federal, state, local, organization, business, association and/or otherwise), that each can employ and/or have associated therewith different sets of rules and/or regulations relative to a similar compliance concept, such as security control, data security, data maintenance and/or the like. The one or more embodiments described herein introduce a concept of context to capture domain-specific knowledge and information that, as compared to other domains, can have differences and/or similarities (e.g., inherent similarities) relative to one another and/or relative to a base and/or target domain (e.g., comprising generally-accepted, standard and/or default information).

Employing the one or more embodiments described herein, artificial intelligence—(AI), machine learning—(ML), and/or deep learning—(DL) supported mapping and/or even automatic generation and/or updating of mapping results for a compliance control based on one or more associate domains can be facilitated. The associate domains can comprise custom, different and/or context-specific information as compared to the target domain. That is, the mapping result generated by the system can provide tracking of context-specific results as compared to base results. This can aid administrating entities in making batter compliance control decisions by balancing and/or comparing context-specific and base results.

Additionally, the mapping can facilitate comparison between domains (e.g., comprising different rule and/or regulation sets) employing different terms, names, languages and/or even sentence structure from one another. That is, although general semantics can vary, the system can map, in an aggregated manner, domains having different technical granularity for different portions of domain-based information (e.g., one or more portions of rules and/or regulation sets comprised by the domains and/or based on the domains).

Indeed, efficient and/or accurate mapping of compliance information from varying domains having differing semantics, views, opinions, rules and/or regulations can be facilitated. Administrating entities can employ the resulting mapping results of the provided compliance control data to leverage varying context-based information, allowing for considered and balanced decision making. Further, cost, time and/or manual labor employed for compliance control aggregation, and thus for maintaining compliance, can be generally reduced.

One or more embodiments are now described with reference to the drawings, where like referenced numerals are used to refer to like elements throughout. As used herein, the terms "entity", "requesting entity" and "user entity" can refer to a machine, device, component, hardware, software, smart device, human and/or group thereof. In the following description, for purposes of explanation, numerous specific details are set forth in order to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting system 100 as illustrated at FIG. 1, and/or systems thereof, can further comprise, be associated with and/or be coupled to one or more computer and/or computing-based elements described herein with reference to an operating environment, such as the operating environment 800 illustrated at FIG. 8. In one or more described embodiments, computer and/or computing-based elements can be used in connection with implementing one or more of the systems, devices, components and/or computer-implemented operations shown and/or described in connection with FIG. 1 and/or with other figures described herein.

Turning first generally to FIG. 1, one or more embodiments described herein can include one or more devices, systems and/or apparatuses that can facilitate semantic role labeling across two or more different languages. For example, FIG. 1 illustrates a block diagram of an example, non-limiting system 100 that can facilitate compliance mapping of compliance control information from a plurality of domains, such as a target domain and one or more associate domains. The mapping results can comprise context-specific labeling for identifying differences and/or inherent similarities among the varying domains.

At FIG. 1, illustrated is a block diagram of an example, non-limiting system 100 that can facilitate a process for compliance mapping of compliance control information from a plurality of domains, in accordance with one or more embodiments described herein. While referring here to one or more processes, facilitations and/or uses of the non-limiting system 100, description provided herein, both above and below, also can be relevant to one or more other non-limiting systems described herein, such as the non-limiting system 200, to be described below in detail.

As illustrated at FIG. 1, the non-limiting system 100 can comprise compliance mapping system 102. Compliance mapping system 102 can comprise one or more components, such as a memory 104, processor 106, bus 105, model 113 and/or mapping component 114. Generally, compliance mapping system 102 can facilitate mapping of a compliance control 150 for a target domain (e.g., comprising a technical specification 134) based on a model 113 trained by an active learning process that incorporates a plurality of contexts representing relationships between entities and associate domain specific dependencies (e.g., of one or more associate domains having context information 136).

One or more aspects of a component can be employed separately and/or in combination, such as employing one or more of a memory or a processor of a system that includes the component to thereby facilitate output of the compliance control 150. The mapping component 114 generally can employ the model 113 to analyze the target and associate domain information (e.g., technical specification 134 and context information 136) to provide aggregated mapping results (e.g., comprised by the compliance control 150). That is, generally, the model 113 can identify and incorporate into the mapping results context-specific labeling. This can be employed to track, compare and/or differentiate between associate domain specific dependencies and target domain dependencies (e.g., default, base and/or generally-accepted information).

The model 113 can be an AI model, ML model and/or DL model. One or more models can be employed. Although shown as stored and/or located at the compliance mapping system 102, a model 113 can be located elsewhere internal to or external to the non-limiting system 100, such as being accessible by the compliance mapping system 102 and/or mapping component 114.

As indicated, the model 113 can be trained on the technical specification 134 information of a target domain and/or context information 136 of one or more associate domains. Regarding the technical specification information 134 and/or context information 136, such data can be input to the model 113 and analyzed by the model 113. Further, the technical specification information 134 and/or context information 136 can be labeled by the model to provide identification of a source of the technical specification information 134 and/or context information 136. In view of the analysis, the model 113 can generally pair and/or recognize portions of the various data sets that are directed to similar and/or same rules, regulations, requirements and/or the like. In this way, a compliance domain-specific model 113 (e.g., based on the set of target/associate domains) can be generated.

Figure 2:
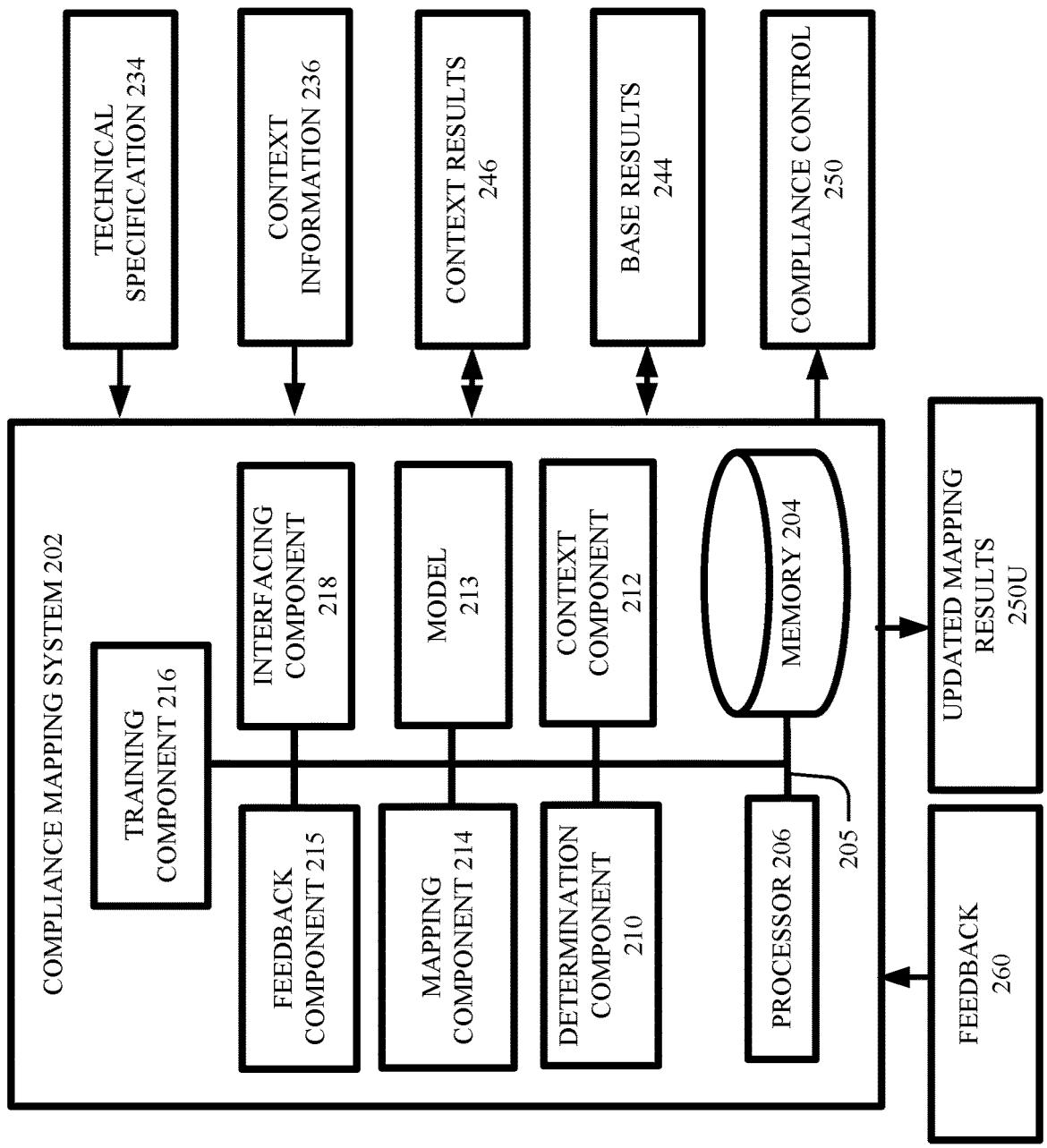
FIG. 2 illustrates a block diagram of another example, non-limiting system that can facilitate compliance mapping, in accordance with one or more embodiments described herein.

Turning next to FIG. 2, the figure illustrates a diagram of an example, non-limiting system 200 that can facilitate a process for compliance mapping of compliance control information from a plurality of domains, in accordance with one or more embodiments described herein. The compliance control information can comprise one or more checks, such as security checks, specified in the target and/or associate domain information.

For example, in one or more cases, the target and associate domains can be based upon different rules and/or regulations for compliance, such as security compliance, from different entities, such as individual entities, federal, state, local, associations, organizations, businesses and/or the like. That is, in one or more cases, there can be varying rules/regulations sets that can guide a use, business and/or the like. Often, each of these sets is expected to be followed, and thus comprehension of comparison between the sets can be desired. There can be a general overlap of information (e.g., standards, requirements, specified checks), but there also can be different and varied information. The overlap can comprise inherent similarities of information that can be difficult to identify, such as due to manual error, time, manpower, language, terminology, sentence structure and/or other semantics.

Repetitive description of like elements and/or processes employed in respective embodiments is omitted for sake of brevity. As indicated previously, description relative to an embodiment of FIG. 1 can be applicable to an embodiment of FIG. 2. Likewise, description relative to an embodiment of FIG. 2 can be applicable to an embodiment of FIG. 1.

As illustrated, the non-limiting system 200 can comprise a compliance mapping system 202. The compliance mapping system 202, as illustrated, can comprise any suitable type of component, machine, device, facility, apparatus and/or instrument that comprises a processor and/or can be capable of effective and/or operative communication with a wired and/or wireless network. All such embodiments are envisioned. For example, compliance mapping system 202 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the compliance mapping system 202 can be disposed and/or run at any suitable device, such as, but not limited to, a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

The compliance mapping system 202 can be associated with, such as accessible via, a cloud computing environment. For example, the compliance mapping system 202 can be associated with a cloud computing environment 950 described below with reference to FIG. 9 and/or with one or more functional abstraction layers described below with reference to FIG. 10 (e.g., hardware and software layer 1060, virtualization layer 1070, management layer 1080 and/or workloads layer 1090).

Operation of the non-limiting system 200 and/or of the compliance mapping system 202 is not limited to generation of context results 246 for a single associate domain and/or to generation of base results 244 for a single target domain at a time. Rather, operation of the non-limiting system 200 and/or of the compliance mapping system 202 can be scalable. For example, the non-limiting system 200 and/or the compliance mapping system 202 can facilitate determination of a plurality of context results 246 and/or base results 244 for a plurality of respective associate and target domains at a same time as one another. In one or more cases, this context generation can be facilitated relative to two or more general compliance domains (e.g., relative to different sets of target/associate domains) at a time.

The compliance mapping system 202 can comprise a plurality of components. The components can include a memory 204, processor 206, bus 205, determination component 210, context component 212, mapping component 214, model 213, feedback component 215, training component 216 and/or interfacing component 218. Like the compliance mapping system 102, the compliance mapping system 202 can be operated to facilitate mapping of a compliance control 250 for a target domain (e.g., comprising a technical specification 234) based on a model 213 trained by an active learning process that incorporates a plurality of contexts representing relationships between entities and associate domain specific dependencies (e.g., of one or more associate domains having context information 236).

One or more communications between one or more components of the non-limiting system 200, and/or between an entity providing the technical specification 234 and/or context information 236 and the non-limiting system 200, can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802. XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion now turns to the processor 206, memory 204 and bus 205 of the compliance mapping system 202.

For example, in one or more embodiments, compliance mapping system 202 can comprise a processor 206 (e.g., computer processing unit, microprocessor, classical processor, quantum processor and/or like processor). In one or more embodiments, a component associated with compliance mapping system 202, as described herein with or without reference to the one or more figures of the one or more embodiments, can comprise one or more computer and/or machine readable, writable and/or executable components and/or instructions that can be executed by processor 206 to facilitate performance of one or more processes defined by such component(s) and/or instruction(s). In one or more embodiments, the processor 206 can comprise the determination component 210, context component 212, mapping component 214, model 213, feedback component 215, training component 216 and/or interfacing component 218.

In one or more embodiments, the compliance mapping system 202 can comprise a computer-readable memory 204 that can be operably connected to the processor 206. The memory 204 can store computer-executable instructions that, upon execution by the processor 206, can cause the processor 206 and/or one or more other components of the compliance mapping system 202 (e.g., determination component 210, context component 212, mapping component 214, model 213, feedback component 215, training component 216 and/or interfacing component 218) to perform one or more actions. In one or more embodiments, the memory 204 can store computer-executable components (e.g., determination component 210, context component 212, mapping component 214, model 213, feedback component 215, training component 216 and/or interfacing component 218).

Compliance mapping system 202 and/or a component thereof as described herein, can be communicatively, electrically, operatively, optically and/or otherwise coupled to one another via a bus 205 to perform functions of non-limiting system 200, compliance mapping system 202 and/or one or more components thereof and/or coupled therewith. Bus 205 can comprise one or more of a memory bus, memory controller, peripheral bus, external bus, local bus, quantum bus and/or another type of bus that can employ one or more bus architectures. One or more of these examples of bus 205 can be employed to implement one or more embodiments described herein.

In one or more embodiments, compliance mapping system 202 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical and/or quantum computing devices, communication devices and/or like devices), such as via a network. In one or more embodiments, one or more of the components of the non-limiting system 200 can reside in the cloud, and/or can reside locally in a local computing environment (e.g., at a specified location(s)).

In addition to the processor 206 and/or memory 204 described above, compliance mapping system 202 can comprise one or more computer and/or machine readable, writable and/or executable components and/or instructions that, when executed by processor 206, can facilitate performance of one or more operations defined by such component(s) and/or instruction(s).

Turning now to the determination component 210, the determination component can identify the technical specification 234 and/or context information 236 in any suitable manner. The technical specification 234 and/or context information 236 can be downloaded, identified, received, uploaded, read and/or otherwise determined. The technical specification 234 and/or context information 236 can be stored at any suitable location internal or external to the compliance mapping system 202 and/or internal or external to the non-limiting system 200.

In one or more cases, the identification by the determination component 210 can be facilitated by the model 213, which can be an AI model, ML model or DL model. The technical specification 234 and/or context information 236 can be determined and/or otherwise identified from one or more knowledge databases, standardized questionnaires, computer-generated inquiries, and/or computer-generated dialogues.

The model 213 employed by the determination component 210, and which also can be employed by the context component 212, the mapping component 214 and/or any other suitable component of the compliance mapping system 202, can be initially trained, such as prior to the use instance by the determination component 210. The model 213 can be trained on the technical specification 234 information of a target domain and/or context information 236 of one or more associate domains, such as upon submitting domain location data to the model 213 to facilitate the training. Although shown as stored and/or located at the compliance mapping system 102, a model 213 can be located elsewhere internal to or external to the non-limiting system 100, such as being accessible by the compliance mapping system 202.

In one or more cases, the model 213 (e.g., AI, ML and/or DL model) can be employed to generate the aforementioned questionnaires, inquiries and/or dialogues, such as employing and/or providing a chatbot and/or other interface. Such interface can be provided by the interfacing component 218 and can comprise any suitable auditory and/or visual interface, such as comprising, without being limiting, a graphical user interface (GUI), touchscreen, data pad, keyboard, mouse, camera, microphone and/or the like.

Turning next to the context component 212, the context component 212 generally can analyze the plurality of context information 236 to thereby output context results 246 (also herein referred to as contexts). For example, the context information 236 from one or more entities (e.g., having the varying sets of regulations/standards/rules) can be sorted by the context component 212, such as where one or more entities have one or more similarity values that characterize one or more associate domain specific dependencies.

The sorting, analysis and identification of similarity values conducted by the context component 212 can be facilitated by the model 213. As indicated above, the model 213 can be an AI model, ML model and/or DL model and can be initially trained, such as prior to the use instance by the context component 212. As a result, the model 213 can execute a context result data generation task and supply context result data (e.g., the context results 246) to define the plurality of contexts for one or more target domains. In one or more cases, each context results 246 can comprise a vector of derived attributes. The context results 246 can comprise one or more labelings and/or metadata characterizing and/or identifying the target domain upon which the context information is based.

In response to its generation, the context results 246 can be validated. The validation can include analysis, approval and/or feedback by one or more entities associated with the respective target domains and/or by one or more other administrating entities. Such validation can be facilitated by the feedback component 215, for example, in association with the aforementioned interfacing component 218. That is, feedback 260 can be provided in any suitable form. The feedback 260 can comprise direct editing of the context information 236. Additionally and/or alternatively, the feedback 260 can be analyzed by the model 213 to generate updated context information 236. The feedback 260 can be employed to further provide detailed labeling of preferred contexts (e.g., context-specific labelings) of the context results 246.

As a result, varying validated context informations 236 (e.g., based on the different target domains) can be provided. A first context information can define a first validation of the context result data 246, and a second context information can define a second validation of the context result data 246, for example. Further, the first and second validations can be labeled based on the respective context preferences, such as to comprise and/or indicate a reference to the one or more entities from which the respective context information 236 was obtained.

That is, as an output of the context component 212, base results 244 based on the target domain and varying context results 246 based on the varying associate domains can be output. The context results 246, e.g., comprising and/or based upon the context information 236, can thus comprise the one or more labelings and/or metadata characterizing and/or identifying the target domain upon which the context information is based. This information/data can be used by an administrating entity to differentiate and/or compare different compliance control checks of a resulting compliance control 250.

The compliance control 250 can comprise an aggregate mapping of the base results 244 and of the context results 246. That is, turning next to the mapping component 214, the mapping component can generally map the compliance control 250 for a target domain based on the model 213 trained by an active learning process that incorporates the plurality of contexts representing relationships between entities and associate domain specific dependencies. Put another way, the mapping component 214 can take as input the base results 244 and context results 246, can aggregate the results 244/246, and can output a set of mapping results defining the compliance control 250. The mapping results can include the aforementioned labeling, notes, comments and/or metadata.

The aggregation can be facilitated by the model 213 by any suitable process. In one example, a set of equations can be employed to represent and/or model the context results 246, base results 244 and mapping results 250. These equations can be employed by the model 213 for assisting the context component 212 and/or mapping component 214.

For example, a common result across all contexts (e.g., across target and associate domains) can be represented by Equation 1 and can describe the most common/agreed mapping and/or context results.

$$\text{result}_{base} = \cap_{n=1}^{N} C_n, \qquad \text{Equation 1:}$$

where C is the context results 246, and N is the number of context sets (e.g., different context sets).

A summation of all possible mapping outcomes can be provided by Equation 2, which can define a pool of context-based mapping results, such as can be output by the mapping component 214.

$$\text{result}_{possible} = (\cap_{n=1}^{N} C_n)'. \qquad \text{Equation 2:}$$

Next, given searcher context(s) X, a result context can be provided, as represented by Equation 3, which can define a set of search context for which the searcher is interested, and/or which can describe the result from contexts similar to that specified in the search criteria based on a selected proximity threshold.

$$\text{result}_{context} = \Sigma_{x=1}^{X} \Sigma_{n=1}^{N} C_x \cup C_n | \text{distance}(x,n) < \text{threshold.} \qquad \text{Equation 3:}$$

The distance (x, n) can be a Euclidean distance between contexts x and n. The threshold can be a selectively determined distance up until which two contexts are considered to be in proximity. Proximity between two contexts can be computed by finding the distance between the result vector by each context following the same search criteria. In one or more cases, an expectation can be that contexts with similar result sets also can comprise similar points of views, opinions and/or the like.

A final mapping result (e.g., mapping results 250), as represented by Equation 4, can be output, comprising tags for context for explainability.

$$\text{mapping\_results}(X) = \begin{cases} \text{result}_{base} \cup \text{result}_{possible}, & X = \emptyset \\ \text{result}_{context}, & X \neq \emptyset \end{cases}. \qquad \text{Equation 4}$$

Figure 3:
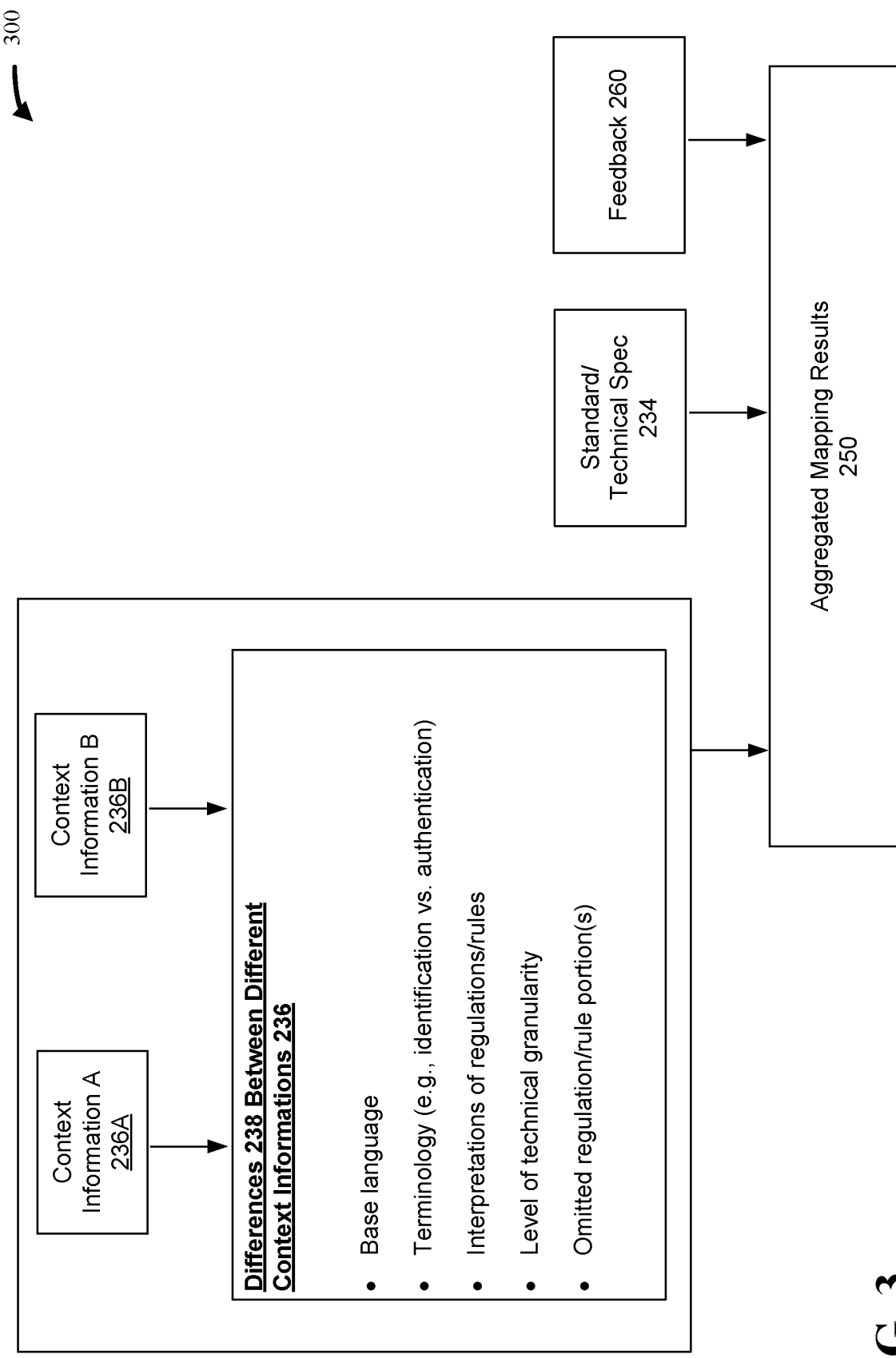
FIG. 3 illustrates a high-level schematic diagram of input and outputs of one or more operations of the non-limiting system of FIG. 2, in accordance with one or more embodiments described herein.

Turning next briefly to FIG. 3, a schematic illustration 300 is provided of the various inputs and output of the compliance mapping system 202. Repetitive description of like elements and/or processes employed in respective embodiments is omitted for sake of brevity.

For example, context information A (236A) and context information B (236B) can be derived from different target domains. As illustrated, the different context information 236 (e.g., 236A and 236B) can comprise differences including, but not limited to, one or more base languages, terminologies, interpretations, level of technical granularity and/or omissions. As additional inputs, the standard/technical specification information 234 can be derived from the target domain. As discussed above, these derivations can be provided by the context component 212 and/or model 213. Feedback information 260 also can be provided, such as facilitated by the feedback component 215 and/or interfacing component 218. As an output, the aggregated mapping results 250 (e.g., compliance control 250) can be provided by the mapping component 214 and/or model 213.

Turning again to FIG. 2, in one or more cases, the output compliance control 250 can be further validated, amended and/or otherwise edited. This can be again facilitated by the feedback component 215 and/or interfacing component 218, in a manner the same as and/or similar to that described above with respect to validation of the context results 246, with respect to additional feedback 260. As a result, updated mapping results 250U (e.g., updated compliance control 250U) can be output by the mapping component 214 and/or compliance mapping system 202.

Turning next to the training component 216, such component can train the model 213, as indicated above relative to initial training of the model 213. Furthermore, the training component 216 can facilitate one or more additional trainings of the model 213 at any suitable and/or selectively determined frequency. For example, training can occur in connection with, in response to and/or after each instance of use of the context component 212, model 213 and/or mapping component 214.

In one or more cases, the training component can feed the mapping results 250 to the model 213, such as to enrich a subsequent execution of the model. In one or more cases, any of the feedback 260 can be fed and/or otherwise input to the model 213. Indeed, such iterative training can further enhance results provided by the model 213, providing further detailed, efficient and/or more accurate results relative to future executions of the model 213.

Figure 4:
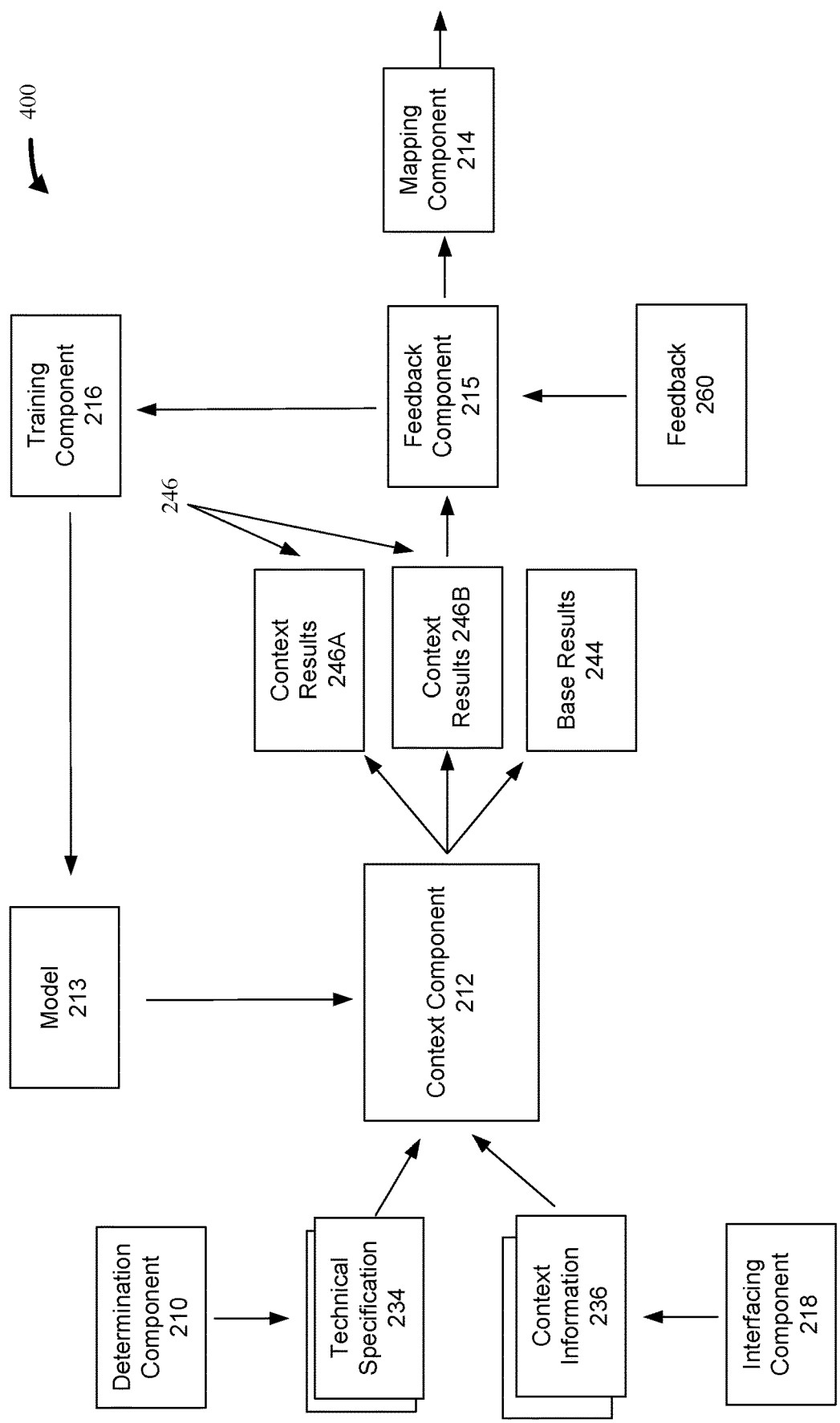
FIG. 4 illustrates a process flow diagram of operations performed by the non-limiting system of FIG. 2, in accordance with one or more embodiments described herein.
Figure 5:
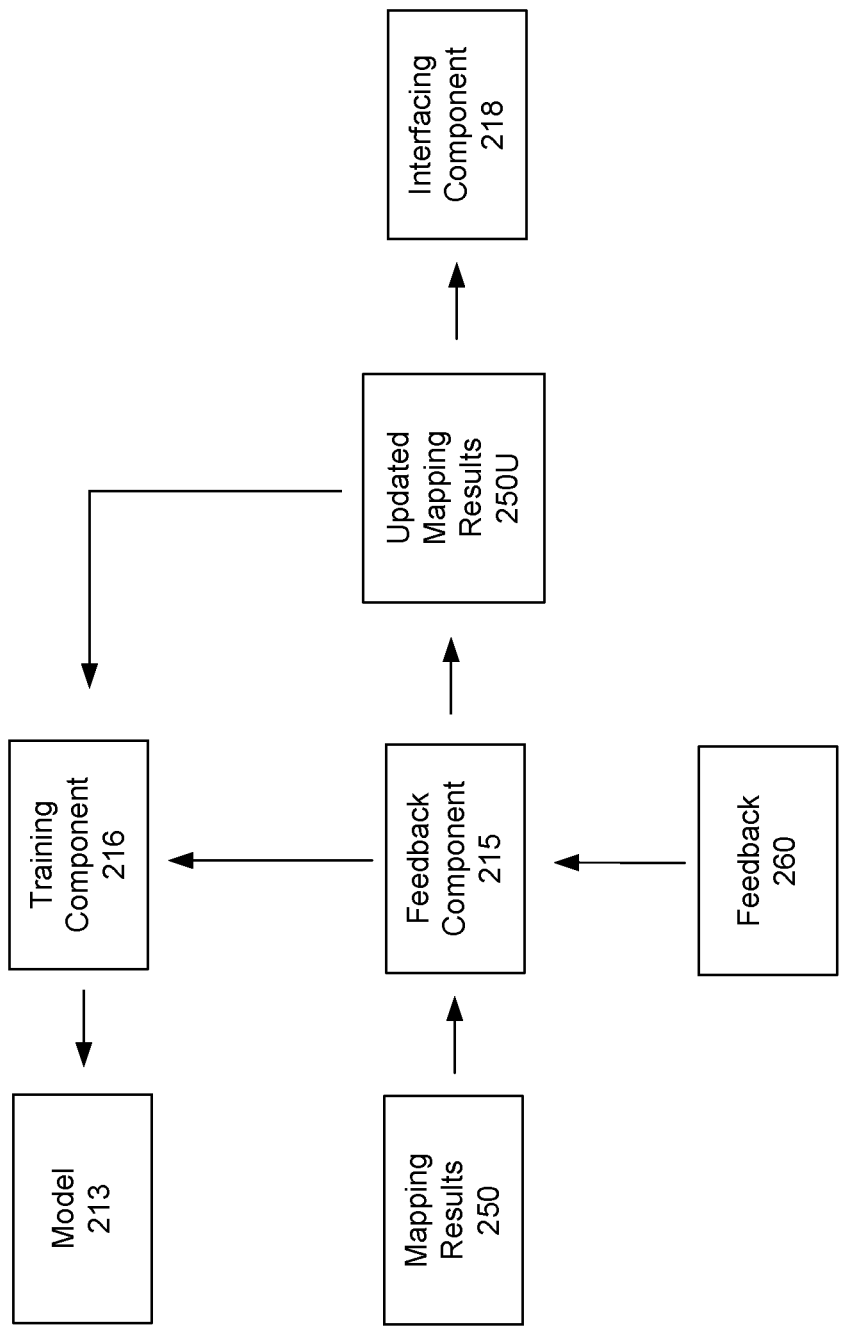
FIG. 5 illustrates a process flow diagram of operations performed by the non-limiting system of FIG. 2, in accordance with one or more embodiments described herein.

Turning now to FIGS. 4 and 5, a process flow of one or more operations performed by the non-limiting system 200 and/or compliance mapping system 202 is illustrated. The process flow comprises two portions 400 and 500 at the separate FIGS. 4 and 5, with portion 500 continuing directly from portion 400. Repetitive description of like elements and/or processes employed in respective embodiments is omitted for sake of brevity.

At FIG. 4, the technical specification 234 is illustrated as being provided by the determination component 210. The context information 236 is illustrated as being provided at least partially by the interfacing component 218. As illustrated, a plurality of technical specifications 234 can be provided relative to a plurality of target domains and/or a plurality of context information 236 can be provided relative to a plurality of associate domains (e.g., with context-specific information). These inputs, along with input from the model 213, can be provided to the context component 212. Input by the model 213 can comprise groupings and/or similarity values relative similar context information from different target domains (e.g., from different providing entities). Outputs can comprise context results 246 (e.g., context results 246A and 246B for respective domains and/or for respective sets of context information 236) and base results 244 (e.g., relative to the target domain and/or for technical specifications 234). The context results 246 can comprise a plurality of context identifiers each being a vector of attributes derived from the context information 236.

The context results 246 can be validated, such as by employing feed back 260 and the feedback component 215. The validated results and/or feedback 260 can be employed by the training component 216 to train the model 213. As a result of the validation, the validated context results 246 and base results 244 can be fed to the mapping component 214.

At FIG. 5, the mapping component 214 can output the mapping results 250 (e.g., compliance control 250). Again, the feedback component 215 and feedback 260 can be employed to validate the mapping results, such as resulting in updated mapping results 250U. The validated mapping and/or feedback 260 can be employed by the training component 216 to train the model 213.

As a result, the updated mapping results 250U can be viewed and/or otherwise analyzed employing the interfacing component 218, such as by an administrating entity.

Figure 6:
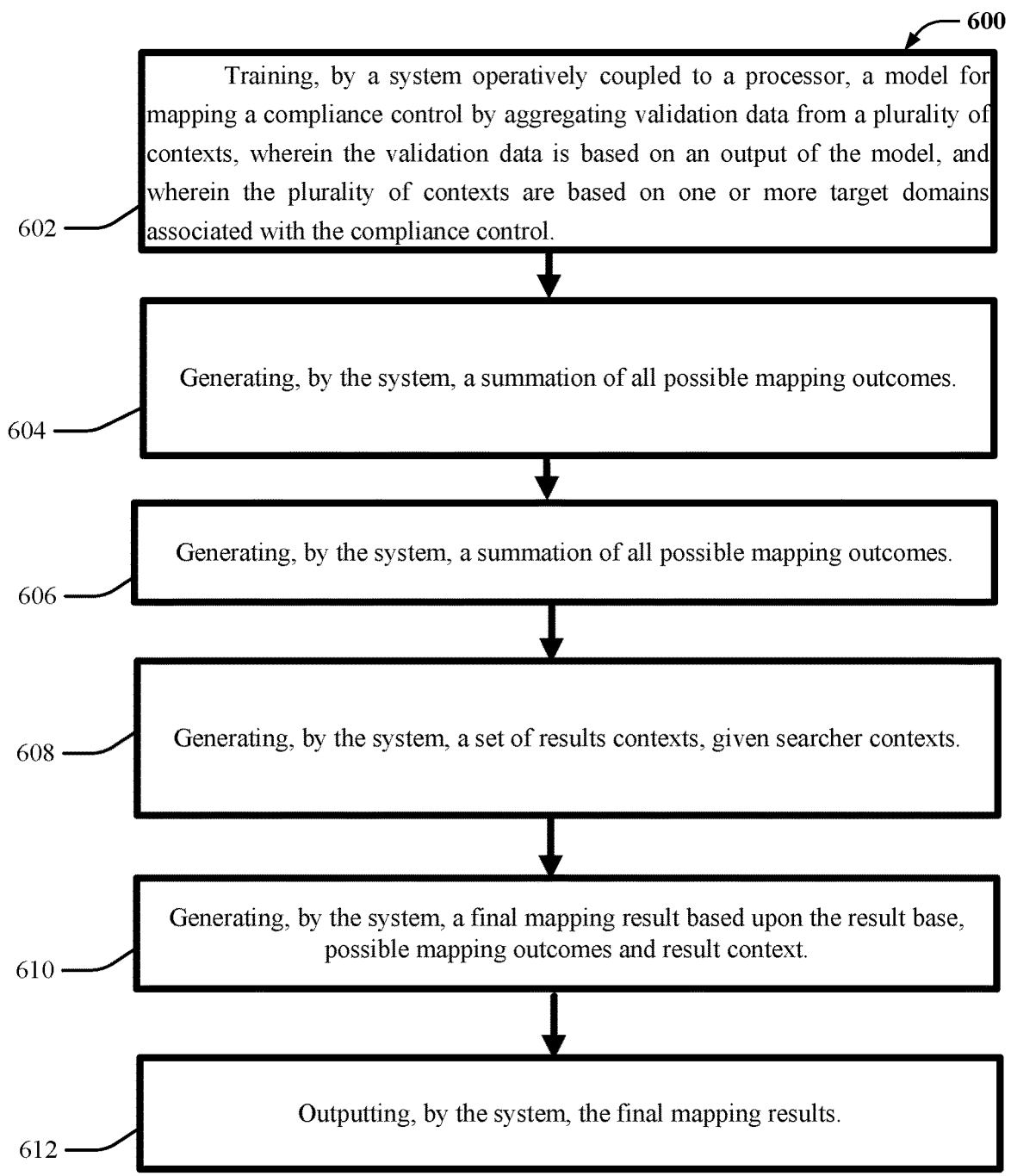
FIG. 6 illustrates a flow diagram of an example, non-limiting method that can facilitate compliance mapping, in accordance with one or more embodiments described herein.

Next, FIG. 6 illustrates a flow diagram of an example, non-limiting method 600 that can facilitate a process for compliance control mapping, in accordance with one or more embodiments described herein, such as the non-limiting 200 of FIG. 2. While the non-limiting method 600 is described relative to the non-limiting system 200 of FIG. 2, the non-limiting method 600 can be applicable also to other systems described herein, such as the non-limiting system 100 of FIG. 1. Repetitive description of like elements and/or processes employed in respective embodiments is omitted for sake of brevity.

At 602, the non-limiting method 600 can comprise training, by a system operatively coupled to a processor (e.g., training component 216), a model for mapping a compliance control by aggregating validation data from a plurality of contexts, wherein the validation data is based on an output of the model, and wherein the plurality of contexts are based on one or more target domains associated with the compliance control.

At 604, the non-limiting method 600 can comprise generating, by the system (e.g., model 213 and/or context component 212, such as employing Equation 1), a result base of most common/agreed mapping and/or context results.

At 606, the non-limiting method 600 can comprise generating, by the system (e.g., model 213 and/or mapping component 214, such as employing Equation 2), a summation of all possible mapping outcomes.

At 608, the non-limiting method 600 can comprise generating, by the system (e.g., model 213 and/or mapping component 214, such as employing Equation 3), a set of results contexts, given searcher contexts.

At 610, the non-limiting method 600 can comprise generating, by the system (e.g., model 213 and/or mapping component 214, such as employing Equation 4), a final mapping result based upon the result base, possible mapping outcomes and result context.

At 612, the non-limiting method 600 can comprise outputting, by the system (e.g., interfacing component 218), the final mapping results.

Figure 7:
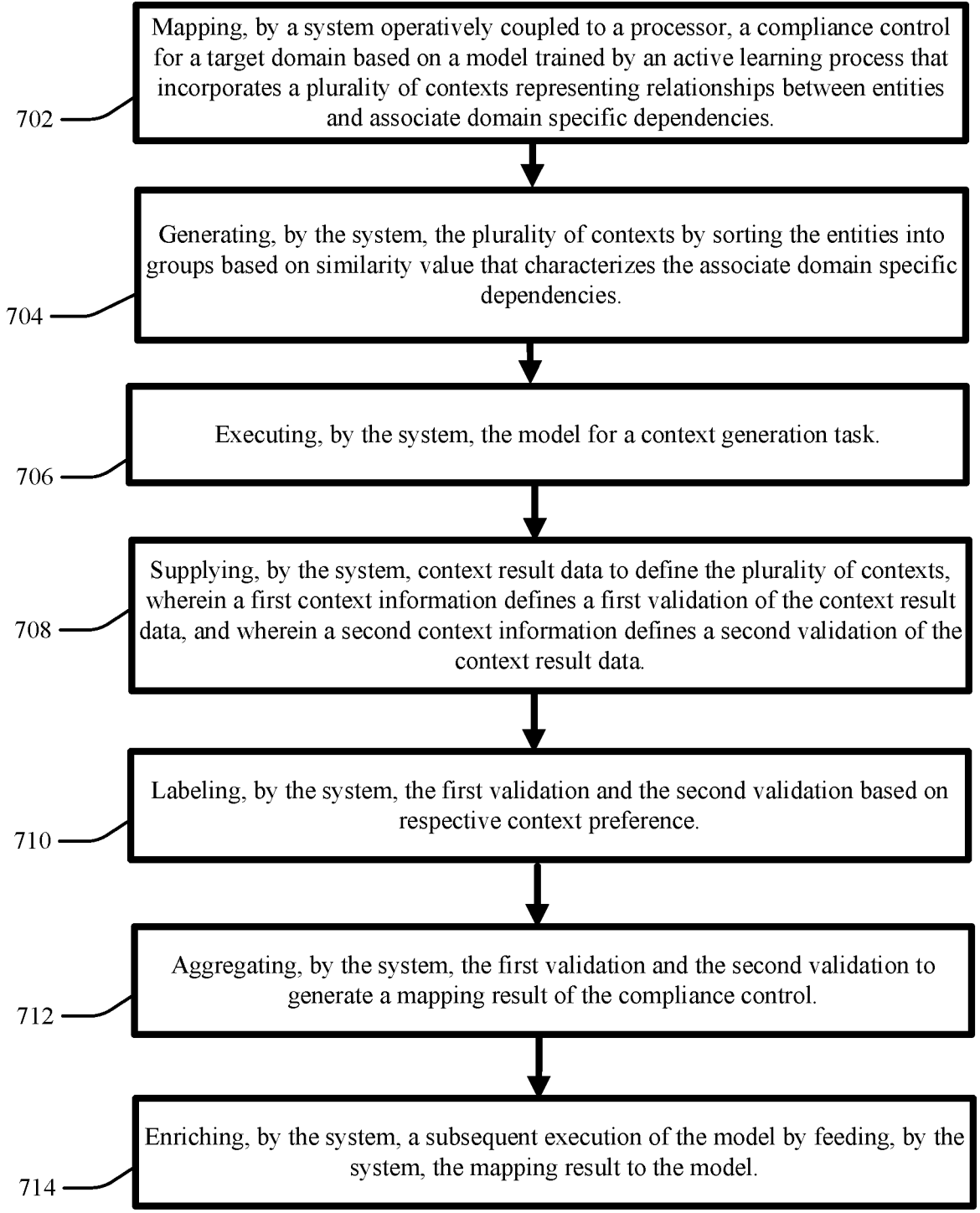
FIG. 7 illustrates a flow diagram of an example, non-limiting method that can facilitate compliance mapping, in accordance with one or more embodiments described herein.

Next, FIG. 7 illustrates a flow diagram of an example, non-limiting method 700 that can facilitate a process for compliance control mapping, in accordance with one or more embodiments described herein, such as the non-limiting 200 of FIG. 2. While the non-limiting method 700 is described relative to the non-limiting system 200 of FIG. 2, the non-limiting method 700 can be applicable also to other systems described herein, such as the non-limiting system 100 of FIG. 1. Repetitive description of like elements and/or processes employed in respective embodiments is omitted for sake of brevity.

At 702, the non-limiting method 700 can comprise mapping, by a system operatively coupled to a processor (e.g., mapping component 214), a compliance control for a target domain based on a model trained by an active learning process that incorporates a plurality of contexts representing relationships between entities and associate domain specific dependencies.

At 704, the non-limiting method 700 can comprise generating, by the system (e.g., context component 212), the plurality of contexts by sorting the entities into groups based on similarity value that characterizes the associate domain specific dependencies.

At 706, the non-limiting method 700 can comprise executing, by the system (e.g., compliance mapping system 202 and/or processor 206), the model (e.g., model 213) for a context generation task.

At 708, the non-limiting method 700 can comprise supplying, by the system (e.g., context component 212), context result data to define the plurality of contexts, wherein a first context information defines a first validation of the context result data, and wherein a second context information defines a second validation of the context result data.

At 710, the non-limiting method 700 can comprise classifying, by the system (e.g., context component 212), the first validation and the second validation based on respective context preference.

At 712, the non-limiting method 700 can comprise aggregating, by the system (e.g., mapping component 214), the first validation and the second validation to generate a mapping result of the compliance control.

At 714, the non-limiting method 700 can comprise enriching, by the system (e.g., training component 216), a subsequent execution of the model by feeding, by the system, the mapping result to the model.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more systems, devices, computer program products and/or computer-implemented methods of use provided herein relate to compliance mapping, and more particularly to aggregated mapping of one or more sets of context-based compliance data with standard compliance data, such as from a target domain and one or more associate domains. A system can comprise a memory that stores computer executable components, and a processor that executes the computer executable components stored in the memory, wherein the computer executable components can comprise a mapping component that can map a compliance control for a target domain based on a model trained by an active learning process that incorporates a plurality of contexts representing relationships between entities and associate domain specific dependencies.

One or more advantages of the aforementioned system, computer-implemented method and/or computer program product can comprise AI-supported and/or even automatic generation and/or updating of mapping results for a compliance control based on one or more associate domains, where the associate domains can comprise custom, different and/or context-specific information as compared to the target domain. That is, the mapping result generated by the system can provide tracking of context-specific results as compared to base results. This can aid administrating entities in making batter compliance control decisions by balancing and/or comparing context-specific and base results.

In one or more cases, the mapping can facilitate comparison between domains (e.g., comprising different rule and/or regulation sets) employing different terms, names, languages and/or even sentence structure from one another. That is, although general semantics can vary, the system can map, in an aggregated manner, domains having different technical granularity for different portions of domain-based information (e.g., one or more portions of rules and/or regulation sets comprised by the domains and/or based on the domains).

In one or more cases, entities can be sorted into groups based on similarity value that characterizes the associate domain specific dependencies. An advantage of this can comprise allowing for comparison of context-specific information with base information of a target domain.

In one or more cases, the model can execute a context generation task and can supply context result data to define the plurality of contexts, wherein a first context information defines a first validation of the context result data, and wherein a second context information defines a second validation of the context result data. An advantage of this can comprise allowing for comparison of context-specific information with base information of a target domain. That is, model-assisted (e.g., AI-assisted, ML-assisted and/or DL-assisted) context generation can be facilitated.

Indeed, in view of the one or more embodiments described herein, a practical application of the systems, computer-implemented methods and/or computer program products described herein can be efficient and/or accurate mapping of compliance information from varying domains having differing semantics, views, opinions, rules and/or regulations. Administrating entities can employ the resulting mapping results of the provided compliance control data to leverage varying context-based information, allowing for considered and balanced decision making. Further, cost, time and/or manual labor employed for compliance control aggregation, and thus for maintaining compliance, can be generally reduced. Overall, such computerized tools can constitute a concrete and tangible technical improvement in the field of compliance control.

One or more embodiments described herein can be, inherently and/or inextricably tied to computer technology and cannot be implemented outside of a computing environment. For example, one or more processes performed by one or more embodiments described herein can more efficiently, and even more feasibly, provide program and/or program instruction execution, such as relative to compliance control mapping, as compared to existing systems and/or techniques lacking such approach(es). Systems, computer-implemented methods and/or computer program products facilitating performance of these processes are of great utility in the field of active computer-based learning and compliance control mapping cannot be equally practicably implemented in a sensible way outside of a computing environment.

One or more embodiments described herein can employ hardware and/or software to solve problems that are highly technical, that are not abstract, and/or that cannot be performed as a set of mental acts by a human. For example, a human, or even thousands of humans, cannot efficiently, accurately and/or effectively employ ML, DL and/or AI to generate and/or map varying information from varying domains relative to compliance control, as the one or more embodiments described herein can facilitate this process. And, neither can the human mind nor a human with pen and paper electronically effectively employ ML, DL and/or AI to generate and/or map varying informations from varying domains relative to compliance control, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing one or more of the one or more operations described herein.

Figure 8:
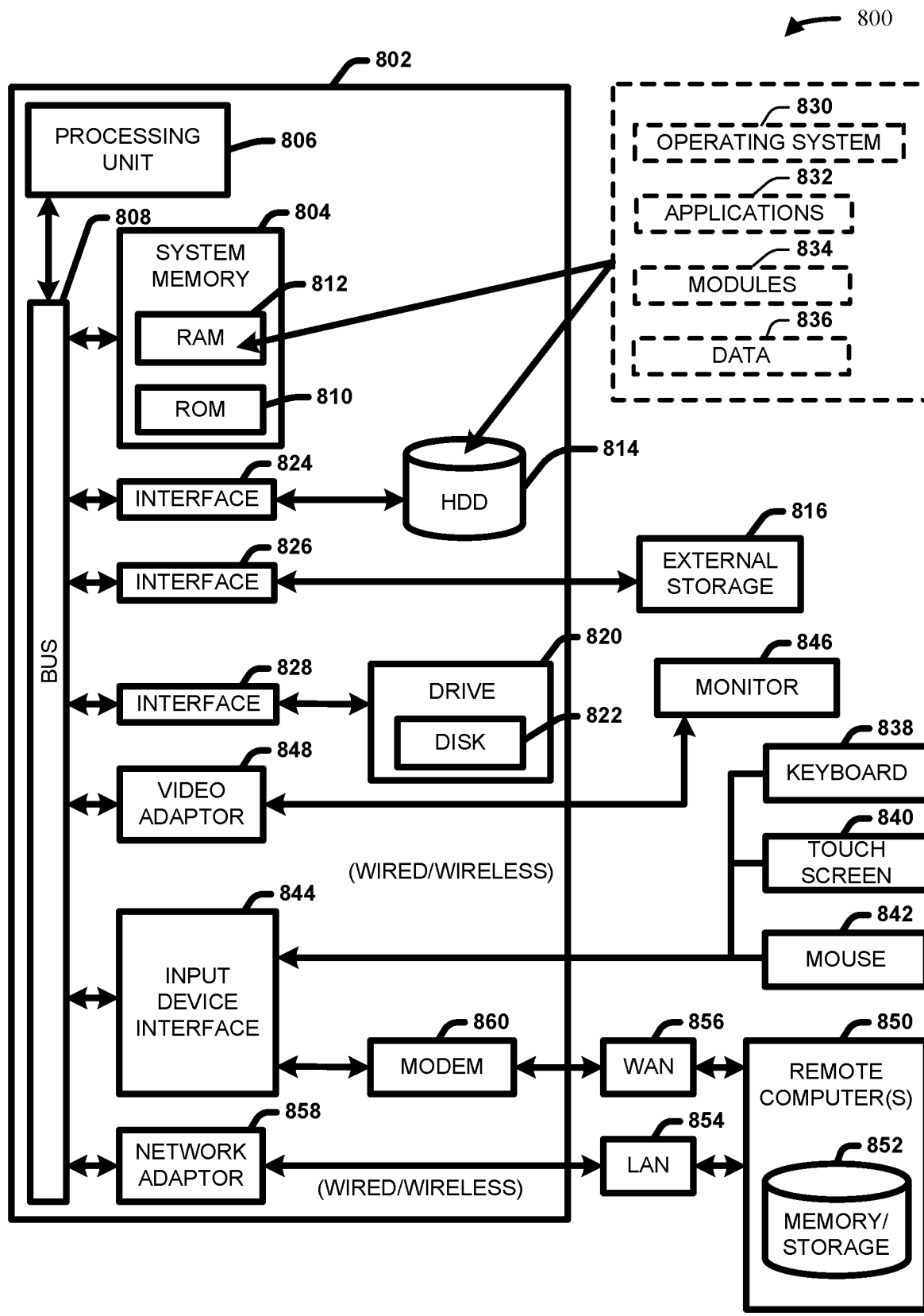
FIG. 8 illustrates a block diagram of an example, non-limiting, operating environment in which one or more embodiments described herein can be facilitated.
Figure 9:
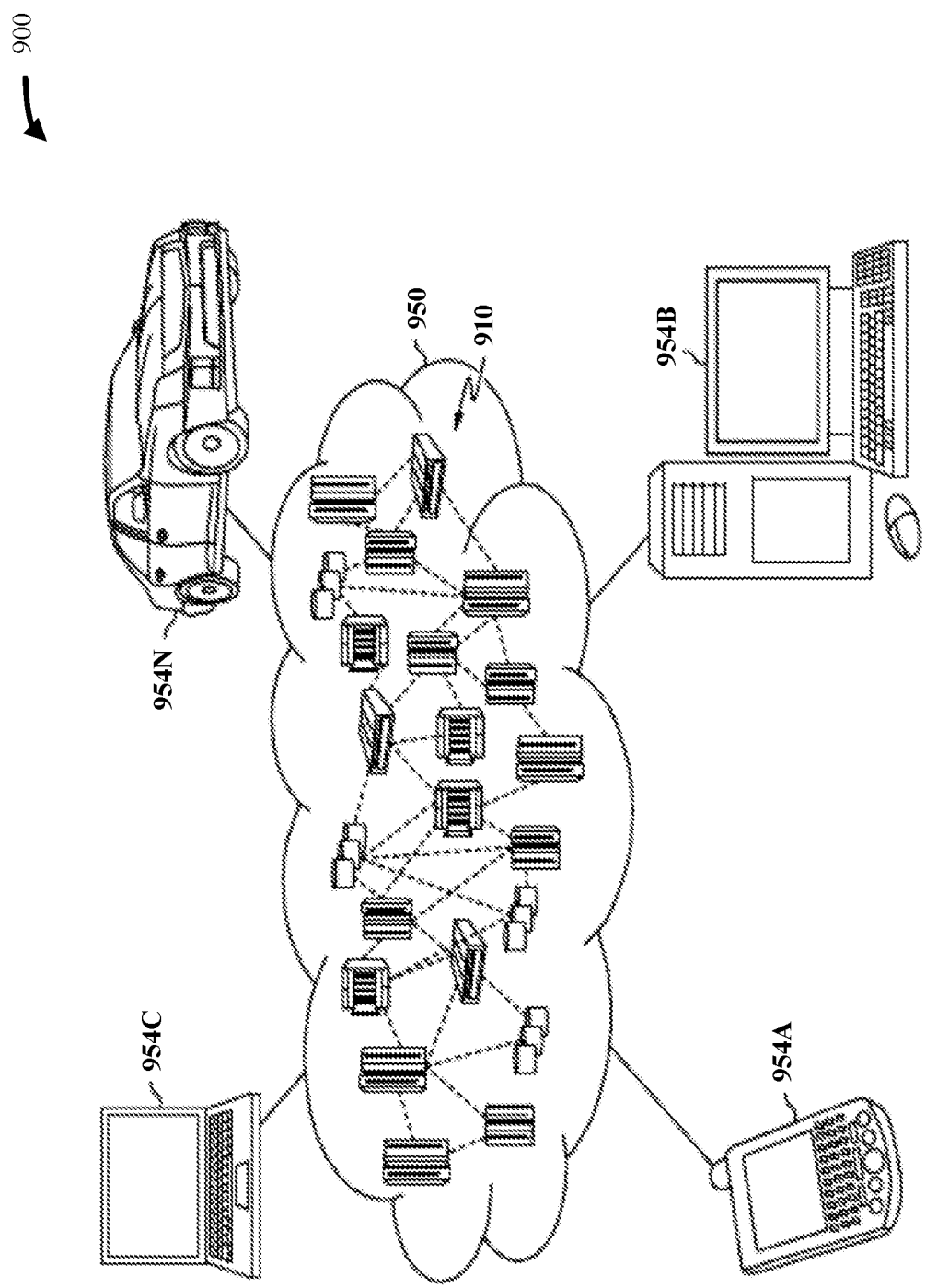
FIG. 9 illustrates a block diagram of an example, non-limiting, cloud computing environment in accordance with one or more embodiments described herein.
Figure 10:
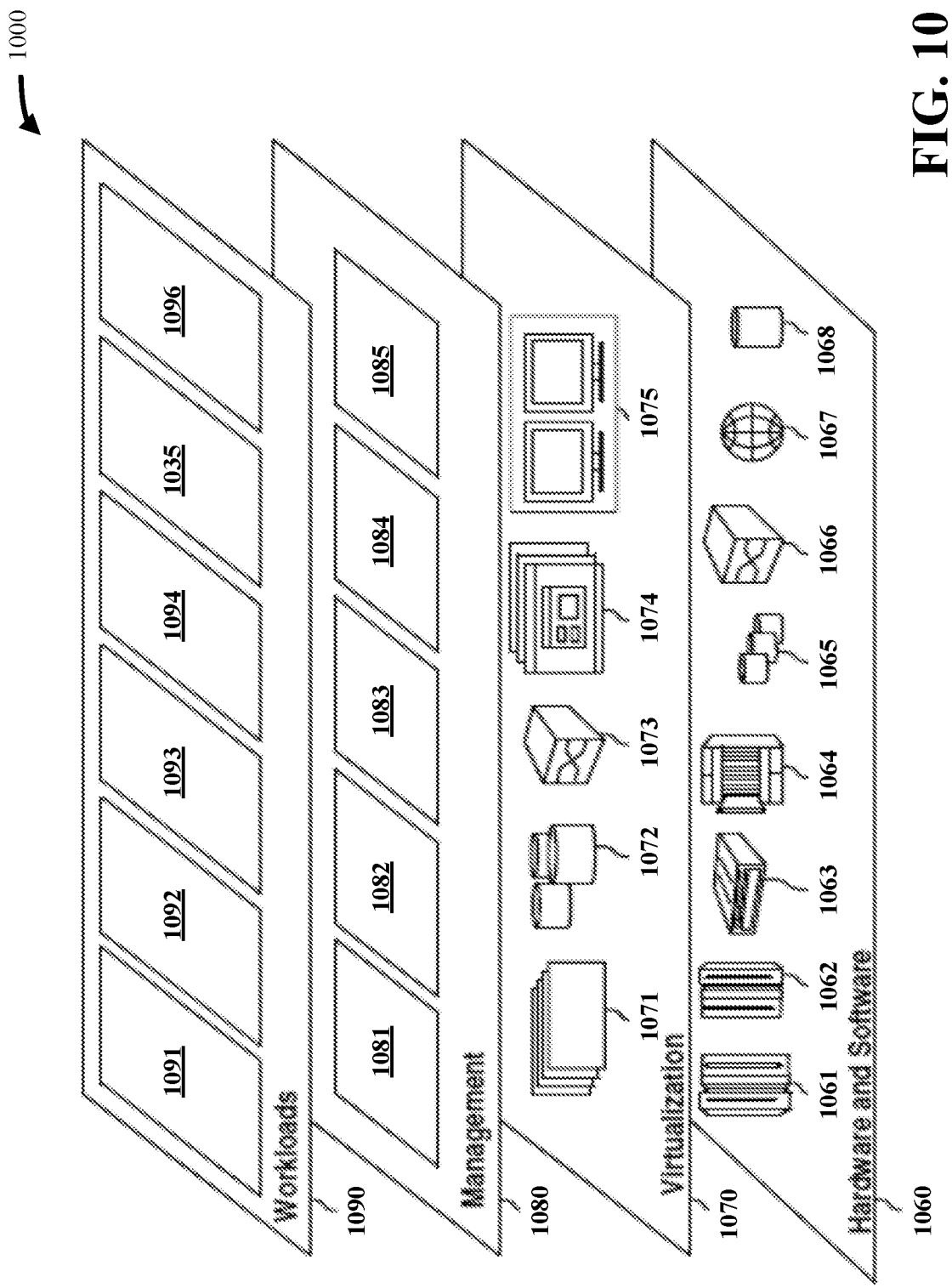
FIG. 10 illustrates a block diagram of example, non-limiting, abstraction model layers in accordance with one or more embodiments described herein.

Turning next to FIGS. 8-10, a detailed description is provided of additional context for the one or more embodiments described herein at FIGS. 1-7.

FIG. 8 and the following discussion are intended to provide a brief, general description of a suitable operating environment 800 in which one or more embodiments described herein at FIGS. 1-7 can be implemented. For example, one or more components and/or other aspects of embodiments described herein can be implemented in or be associated with, such as accessible via, the operating environment 800. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, the aforedescribed methods can be practiced with other computer system configurations, including single-processor or multiprocessor computer systems, mini-computers, mainframe computers, Internet of Things (IoT) devices, distributed computing systems, as well as personal computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared and/or other wireless media.

With reference still to FIG. 8, the example operating environment 800 for implementing one or more embodiments of the aspects described herein can include a computer 802, the computer 802 including a processing unit 806, a system memory 804 and/or a system bus 808. One or more aspects of the processing unit 806 can be applied to processors such as 106 and/or 206 of the non-limiting systems 100 and/or 200. The processing unit 806 can be implemented in combination with and/or alternatively to processors such as 106 and/or 206.

Memory 804 can store one or more computer and/or machine readable, writable and/or executable components and/or instructions that, when executed by processing unit 806 (e.g., a classical processor, a quantum processor and/or like processor), can facilitate performance of operations defined by the executable component(s) and/or instruction (s). For example, memory 804 can store computer and/or machine readable, writable and/or executable components and/or instructions that, when executed by processing unit 806, can facilitate execution of the one or more functions described herein relating to non-limiting system 100 and/or non-limiting system 200, as described herein with or without reference to the one or more figures of the one or more embodiments.

Memory 804 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures.

Processing unit 806 can comprise one or more types of processors and/or electronic circuitry (e.g., a classical processor, a quantum processor and/or like processor) that can implement one or more computer and/or machine readable, writable and/or executable components and/or instructions that can be stored at memory 804. For example, processing unit 806 can perform one or more operations that can be specified by computer and/or machine readable, writable and/or executable components and/or instructions including, but not limited to, logic, control, input/output (I/O), arithmetic and/or the like. In one or more embodiments, processing unit 806 can be any of one or more commercially available processors. In one or more embodiments, processing unit 806 can comprise one or more central processing unit, multi-core processor, microprocessor, dual microprocessors, microcontroller, System on a Chip (SOC), array processor, vector processor, quantum processor and/or another type of processor. The examples of processing unit 806 can be employed to implement one or more embodiments described herein.

The system bus 808 can couple system components including, but not limited to, the system memory 804 to the processing unit 806. The system bus 808 can comprise one or more types of bus structure that can further interconnect to a memory bus (with or without a memory controller), a peripheral bus and/or a local bus using one or more of a variety of commercially available bus architectures. The system memory 804 can include ROM 810 and/or RAM 812. A basic input/output system (BIOS) can be stored in a non-volatile memory such as ROM, erasable programmable read only memory (EPROM) and/or EEPROM, which BIOS contains the basic routines that help to transfer information among elements within the computer 802, such as during startup. The RAM 812 can include a high-speed RAM, such as static RAM for caching data.

The computer 802 can include an internal hard disk drive (HDD) 814 (e.g., EIDE, SATA), one or more external storage devices 816 (e.g., a magnetic floppy disk drive (FDD), a memory stick or flash drive reader, a memory card reader and/or the like) and/or a drive 820, e.g., such as a solid state drive or an optical disk drive, which can read or write from a disk 822, such as a CD-ROM disc, a DVD, a BD and/or the like. Additionally, and/or alternatively, where a solid state drive is involved, disk 822 could not be included, unless separate. While the internal HDD 814 is illustrated as located within the computer 802, the internal HDD 814 can also be configured for external use in a suitable chassis (not shown). Additionally, while not shown in operating environment 800, a solid state drive (SSD) can be used in addition to, or in place of, an HDD 814. The HDD 814, external storage device(s) 816 and drive 820 can be connected to the system bus 808 by an HDD interface 824, an external storage interface 826 and a drive interface 828, respectively. The HDD interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 812, including an operating system 830, one or more applications 832, other program modules 834 and/or program data 836. All or portions of the operating system, applications, modules and/or data can also be cached in the RAM 812. The systems and/or methods described herein can be implemented utilizing one or more commercially available operating systems and/or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In a related embodiment, operating system 830 can comprise one virtual machine (VM) of multiple VMs hosted at computer 802. Furthermore, operating system 830 can provide runtime environments, such as the JAVA runtime environment or the .NET framework, for applications 832. Runtime environments are consistent execution environments that can allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and/or settings for an application.

Further, computer 802 can be enabled with a security module, such as a trusted processing module (TPM). For instance, with a TPM, boot components hash next in time boot components and wait for a match of results to secured values before loading a next boot component. This process can take place at any layer in the code execution stack of computer 802, e.g., applied at application execution level and/or at operating system (OS) kernel level, thereby enabling security at any level of code execution.

An entity can enter and/or transmit commands and/or information into the computer 802 through one or more wired/wireless input devices, e.g., a keyboard 838, a touch screen 840 and/or a pointing device, such as a mouse 842. Other input devices (not shown) can include a microphone, an infrared (IR) remote control, a radio frequency (RF) remote control and/or other remote control, a joystick, a virtual reality controller and/or virtual reality headset, a game pad, a stylus pen, an image input device, e.g., camera (s), a gesture sensor input device, a vision movement sensor input device, an emotion or facial detection device, a biometric input device, e.g., fingerprint and/or iris scanner, and/or the like. These and other input devices can be connected to the processing unit 806 through an input device interface 844 that can be coupled to the system bus 808, but can be connected by other interfaces, such as a parallel port, an IEEE 1394 serial port, a game port, a USB port, an IR interface, a BLUETOOTH® interface and/or the like.

A monitor 846 or other type of display device can be alternatively and/or additionally connected to the system bus 808 via an interface, such as a video adapter 848. In addition to the monitor 846, a computer typically includes other peripheral output devices (not shown), such as speakers, printers and/or the like.

The computer 802 can operate in a networked environment using logical connections via wired and/or wireless communications to one or more remote computers, such as a remote computer(s) 850. The remote computer(s) 850 can be a workstation, a server computer, a router, a personal computer, portable computer, microprocessor-based entertainment appliance, a peer device and/or other common network node, and typically includes many or all of the elements described relative to the computer 802, although, for purposes of brevity, only a memory/storage device 852 is illustrated. Additionally, and/or alternatively, the computer 802 can be coupled (e.g., communicatively, electrically, operatively, optically and/or the like) to one or more external systems, sources and/or devices (e.g., classical and/or quantum computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802. XX wireless technologies and/or legacy telecommunication technologies, BLUETOOTH®, Session Initiation Protocol (SIP), ZIG-BEE®, RF4CE protocol, WirelessHART protocol, 6LoW-PAN (IPv6 over Low power Wireless Area Networks), Z-Wave, an ANT, an ultra-wideband (UWB) standard protocol and/or other proprietary and/or non-proprietary communication protocols. In a related example, one or more embodiments described herein can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and/or software that facilitates communicating information among one or more embodiments described herein and external systems, sources and/or devices (e.g., computing devices, communication devices and/or the like).

The logical connections depicted include wired/wireless connectivity to a local area network (LAN) 854 and/or larger networks, e.g., a wide area network (WAN) 856. LAN and WAN networking environments can be commonplace in offices and companies and can facilitate enterprise-wide computer networks, such as intranets, all of which can connect to a global communications network, e.g., the Internet.

When used in a LAN networking environment, the computer 802 can be connected to the local network 854 through a wired and/or wireless communication network interface or adapter 858. The adapter 858 can facilitate wired and/or wireless communication to the LAN 854, which can also include a wireless access point (AP) disposed thereon for communicating with the adapter 858 in a wireless mode.

When used in a WAN networking environment, the computer 802 can include a modem 860 and/or can be connected to a communications server on the WAN 856 via other means for establishing communications over the WAN 856, such as by way of the Internet. The modem 860, which can be internal and/or external and a wired and/or wireless device, can be connected to the system bus 808 via the input device interface 844. In a networked environment, program modules depicted relative to the computer 802 or portions thereof can be stored in the remote memory/storage device 852. The network connections shown are merely exemplary and one or more other means of establishing a communications link among the computers can be used.

When used in either a LAN or WAN networking environment, the computer 802 can access cloud storage systems or other network-based storage systems in addition to, and/or in place of, external storage devices 816 as described above, such as but not limited to, a network virtual machine providing one or more aspects of storage and/or processing of information. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, such as with the aid of the adapter 858 and/or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices and/or entities operatively disposed in wireless communication, e.g., a printer, scanner, desktop and/or portable computer, portable data assistant, communications satellite, telephone and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be employed relative to distributed computing environments (e.g., cloud computing environments), such as described below with respect to FIG. 13, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1950 described below with reference to FIG. 9, and/or with reference to the one or more functional abstraction layers (e.g., quantum software and/or the like) described below with reference to FIG. 10, to execute one or more operations in accordance with one or more embodiments described herein. For example, cloud computing environment 950 and/or one or more of the functional abstraction layers 1060, 1070, 1080 and/or 1090 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by one or more embodiments described herein and/or components thereof to execute one or more operations in accordance with one or more embodiments described herein. For instance, one or more embodiments described herein and/or components thereof can employ such one or more classical and/or quantum computing resources to execute one or more classical and/or quantum: mathematical function, calculation and/or equation; computing and/or processing script; algorithm; model (e.g., artificial intelligence (AI) model, machine learning (ML) model and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and/or services) that can be rapidly provisioned and released with minimal management effort or interaction with a provider of the service. This cloud model can include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can specify location at a higher level of abstraction (e.g., country, state and/or datacenter).

Rapid elasticity: capabilities can be rapidly and elastically provisioned, in one or more cases automatically, to quickly scale out and rapidly released to quickly scale in. To the consumer, the capabilities available for provisioning can appear to be unlimited and can be purchased in any quantity at any time.

Measured service: cloud systems automatically control and optimize resource use by leveraging a metering capability at one or more levels of abstraction appropriate to the type of service (e.g., storage, processing, bandwidth and/or active user accounts). Resource usage can be monitored, controlled and/or reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage and/or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems and/or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as Follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the non-limiting system 100 and/or the example operating environment 800 can be associated with and/or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting system 100 and/or example operating environment 800 can be employed to use hardware and/or software to solve problems that are highly technical in nature, that are not abstract and/or that cannot be performed as a set of mental acts by a human.

Referring now to details of one or more aspects illustrated at FIG. 9, the illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C and/or automobile computer system 954N can communicate. Although not illustrated in FIG. 9, cloud computing nodes 910 can further comprise a quantum platform (e.g., quantum computer, quantum hardware, quantum software and/or the like) with which local computing devices used by cloud consumers can communicate. Cloud computing nodes 910 can communicate with one another. They can be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that cloud computing nodes 910 and cloud computing environment 950 can communicate with any type of computerized device over any type of network and/or network addressable connection (e.g., using a web browser).

Referring now to details of one or more aspects illustrated at FIG. 10, a set 1000 of functional abstraction layers is shown, such as provided by cloud computing environment 950 (FIG. 19). One or more embodiments described herein can be associated with, such as accessible via, one or more functional abstraction layers described below with reference to FIG. 10 (e.g., hardware and software layer 1060, virtualization layer 1070, management layer 1080 and/or workloads layer 1090). It should be understood in advance that the components, layers and/or functions shown in FIG. 10 are intended to be illustrative only and embodiments described herein are not limited thereto. As depicted, the following layers and/or corresponding functions are provided:

Hardware and software layer 1060 can include hardware and software components. Examples of hardware components include: mainframes 1061; RISC (Reduced Instruction Set Computer) architecture-based servers 1062; servers 1063; blade servers 1064; storage devices 1065; and/or networks and/or networking components 1066. In one or more embodiments, software components can include network application server software 1067, quantum platform routing software 1068; and/or quantum software (not illustrated in FIG. 10).

Virtualization layer 1070 can provide an abstraction layer from which the following examples of virtual entities can be provided: virtual servers 1071; virtual storage 1072; virtual networks 1073, including virtual private networks; virtual applications and/or operating systems 1074; and/or virtual clients 1075.

In one example, management layer 1080 can provide the functions described below. Resource provisioning 1081 can provide dynamic procurement of computing resources and other resources that can be utilized to perform tasks within the cloud computing environment. Metering and Pricing 1082 can provide cost tracking as resources are utilized within the cloud computing environment, and/or billing and/or invoicing for consumption of these resources. In one example, these resources can include one or more application software licenses. Security can provide identity verification for cloud consumers and/or tasks, as well as protection for data and/or other resources. User (or entity) portal 1083 can provide access to the cloud computing environment for consumers and system administrators. Service level management 1084 can provide cloud computing resource allocation and/or management such that required service levels are met. Service Level Agreement (SLA) planning and fulfillment 1085 can provide pre-arrangement for, and procurement of, cloud computing resources for which a future requirement is anticipated in accordance with an SLA.

Workloads layer 1090 can provide examples of functionality for which the cloud computing environment can be utilized. Non-limiting examples of workloads and functions which can be provided from this layer include: mapping and navigation 1091; software development and lifecycle management 1092; virtual classroom education delivery 1093; data analytics processing 1094; transaction processing 1095; and/or application transformation software 1096.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures and/or the like that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
    a memory that stores computer executable components; and
    a processor that executes at least one of the computer executable components that:
        trains a machine learning model to map compliance controls for target domains, wherein the training comprises:
            receiving a plurality of context result data sets for a plurality of contexts, wherein each context result data set corresponds to a respective context of the plurality of contexts derived from a respective associate domain specific dependency for an associate domain among entities in a target domain;
            for each context result data set, validating context result data of the context result data set to generate validation data representing semantic relationships within the respective context;
            aggregating the validation data from the respective contexts to form an aggregated data set;
            mapping, using the machine learning model and the aggregated data set, a compliance control to the respective contexts;
            presenting, via a user interface, the mapping of the compliance control to the contexts;
            receiving, via the user interface, feedback regarding the mapping; and
            updating the mapping based on the feedback.

2. The system of claim 1, wherein the at least one of the computer executable components further:
    generates the plurality of contexts by sorting the entities into groups based on similarity value that characterizes the associate domain specific dependencies.

3. The system of claim 2, wherein the at least one of the computer executable components further:
    executes, using the machine learning model, a context generation task to generate context result data to define the plurality of contexts, wherein a first context information defines a first validation of the context result data, and wherein a second context information defines a second validation of the context result data.

4. The system of claim 3, wherein the at least one of the computer executable components further:
    labels the first validation and the second validation based on respective context preference, and aggregates the first validation and the second validation to generate a mapping result of the compliance control.

5. The system of claim 1, wherein the user interface is a chatbot.

6. A system, comprising:
    a memory that stores computer executable components; and
    a processor that executes at least one of the computer executable components that:
        generates, using a machine learning model, a mapping of a compliance control for a target domain, wherein generating the mapping comprises:
            receiving a plurality of context result data sets for a plurality of contexts, wherein each context result data set corresponds to a respective context of the plurality of contexts derived from a respective associate domain specific dependency for an associate domain among entities in a target domain, for each context result data set, validating context result data of the context result data set to generate validation data representing semantic relationships within the respective context;

aggregating the validation data from respective contexts to form an aggregated data set;

mapping, using the machine learning model and the aggregated data set, the compliance control to the respective contexts;

presenting, via a user interface, the mapping of the compliance control to the contexts;

receiving, via the user interface, feedback regarding the mapping; and updating the mapping based on the feedback.

7. The system of claim 6, wherein the at least one of the computer executable components further:

generates the plurality of contexts by sorting the entities into groups based on similarity value that characterizes the associate domain specific dependencies associated with the entities.

8. The system of claim 7, wherein the at least one of the computer executable components further:

executes, using the machine learning model, a context generation task to generate context result data to define the plurality of contexts, wherein a first context information defines a first validation of the context result data, and wherein a second context information defines a second validation of the context result data.

9. The system of claim 8, wherein the at least one of the computer executable components further:

labels the first validation and the second validation based on respective context preference, and aggregates the first validation and the second validation to generate a mapping result of the compliance control.

10. The system of claim 6, wherein the user interface is a chatbot.

11. A computer-implemented method, comprising:

training, by a system operatively coupled to a processor, a machine learning model to map compliance controls for target domains, wherein the training comprises:

receiving a plurality of context result data sets for a plurality of contexts, wherein each context result data set corresponds to a respective context of the plurality of contexts derived from a respective associate domain specific dependency for an associate domain among entities in a target domain;

for each context result data set, validating context result data of the context result data set to generate validation data representing semantic relationships within the respective context;

aggregating the validation data from the respective contexts to form an aggregated data set;

mapping, using the machine learning model and the aggregated data set, a compliance control to the respective contexts;

presenting, via a user interface, the mapping of the compliance control to the contexts;

receiving, via the user interface, feedback regarding the mapping; and updating the mapping based on the feedback.

12. The computer-implemented method of claim 11, further comprising:

generating, by the system, the plurality of contexts by sorting the entities into groups based on similarity value that characterizes the associate domain specific dependencies.

13. The computer-implemented method of claim 12, further comprising:

executing, by the system, using the machine learning model, a context generation task to generate context result data to define the plurality of contexts, wherein a first context information defines a first validation of the context result data, and wherein a second context information defines a second validation of the context result data.

14. The computer-implemented method of claim 13, further comprising:

labeling, by the system, the first validation and the second validation based on respective context preference; and aggregating, by the system, the first validation and the second validation to generate a mapping result of the compliance control.

15. The computer-implemented method of claim 11, wherein the user interface is a chatbot.

16. A computer-implemented method, comprising:

generating, by a system operatively coupled to a processor, using a machine learning model, a mapping of a compliance control for a target domain, wherein generating the mapping comprises:

receiving a plurality of context result data sets for a plurality of contexts, wherein each context result data set corresponds to a respective context of the plurality of contexts derived from a respective associate domain specific dependency for an associate domain among entities in a target domain, for each context result data set, validating context result data of the context result data set to generate validation data representing semantic relationships within the respective context;

aggregating the validation data from respective contexts to form an aggregated data set;

mapping, using the machine learning model and the aggregated data set, the compliance control to the respective contexts;

presenting, via a user interface, the mapping of the compliance control to the contexts;

receiving, via the user interface, feedback regarding the mapping; and updating the mapping based on the feedback.

17. The computer-implemented method of claim 16, further comprising:

generating, by the system, the plurality of contexts by sorting the entities into groups based on similarity value that characterizes the associate domain specific dependencies associated with the entities.

18. The computer-implemented method of claim 17, further comprising:

executing, by the system, using the machine learning model, a context generation task to generate context result data to define the plurality of contexts, wherein a first context information defines a first validation of the context result data, and wherein a second context information defines a second validation of the context result data.

19. The computer-implemented method of claim 18, further comprising:

labeling, by the system, the first validation and the second validation based on respective context preference; and aggregating, by the system, the first validation and the second validation to generate a mapping result of the compliance control.

20. The computer-implemented method of claim 16, wherein the user interface is a chatbot.

21. A computer program product that facilitates compliance control mapping, the computer program product comprising a computer readable storage medium having program instructions embodied therewith, the program instructions executable by a processor to cause the processor to:
   train a machine learning model to map compliance controls for target domains, wherein the training comprises:
      receiving a plurality of context result data sets for a plurality of contexts, wherein each context result data set corresponds to a respective context of the plurality of contexts derived from a respective associate domain specific dependency for an associate domain among entities in a target domain;
      for each context result data set, validating context result data of the context result data set to generate validation data representing semantic relationships within the respective context;
      aggregating the validation data from the respective contexts to form an aggregated data set;
      mapping, using the machine learning model and the aggregated data set a compliance control
      presenting, via a user interface, the mapping of the compliance control to the contexts;
      receiving, via the user interface, feedback regarding the mapping;
      updating the mapping based on the feedback for a target domain based on a model trained by an active learning process that incorporates a plurality of contexts representing relationships between entities and associate domain specific dependencies.

22. The computer program product of claim 21, wherein the program instructions further cause the processor to:
   generate the plurality of contexts by sorting the entities into groups based on similarity value that characterizes the associate domain specific dependencies.

23. The computer program product of claim 22, wherein the program instructions further cause the processor to:
   execute, using the machine learning model, a context generation task to generate context result data to define the plurality of contexts, wherein a first context information defines a first validation of the context result data, and wherein a second context information defines a second validation of the context result data.

24. The computer program product of claim 23, wherein the program instructions further cause the processor to:
   label the first validation and the second validation based on respective context preference; and
   aggregate the first validation and the second validation to generate a mapping result of the compliance control.

25. The computer program product of claim 24, wherein the user interface is a chatbot.

\* \* \* \* \*